(12) United States Patent
Ruwisch (10) Patent No.: US 6,683,961 B2
(45) Date of Patent: Jan. 27, 2004

(54) PROCESS AND APPARATUS FOR ELIMINATING LOUDSPEAKER INTERFERENCE FROM MICROPHONE SIGNALS

(76) Inventor: Dietmar Ruwisch, Gutenbergstr. 11, 12557 Berlin (DE)

(*) Notice: Subject to any disclaimer, the term of this patent is extended or adjusted under 35 U.S.C. 154(b) by 238 days.

(21) Appl. No.: 09/946,459

(22) Filed: Sep. 4, 2001

(65) Prior Publication Data

US 2003/0156723 A1 Aug. 21, 2003

(30) Foreign Application Priority Data

Sep. 1, 2000 (DE) .......................... 100 43 064

(51) Int. Cl.[7] .................. H04B 15/00; H04R 29/00
(52) U.S. Cl. .................................. 381/93; 381/56
(58) Field of Search ............... 381/83, 93, 56, 381/58, 59, 96, 98, 66; 379/406.01, 406.02, 406.15; 708/322

(56) References Cited

U.S. PATENT DOCUMENTS

| | | | | |
|---|---|---|---|---|
| 5,694,476 A | * | 12/1997 | Klippel | 381/96 |
| 5,768,398 A | * | 6/1998 | Janse et al. | 381/103 |
| 6,111,957 A | * | 8/2000 | Thomasson | 381/15 |

* cited by examiner

*Primary Examiner*—Xu Mei
(74) *Attorney, Agent, or Firm*—Birch, Stewart, Kolasch & Birch, LLP (57) ABSTRACT

Filter system designed to remove loudspeaker-generated sound signals from a microphone signal, comprising a stereo sampling unit for sampling the interference-bearing microphone signal as well as the interfering loudspeaker signal in time (t) to generate samples $x(t)$ and $z(t)$ for provision to a computation unit which derives the transfer function $H(f,T)$ effective between the loudspeaker and the microphone and applies that function to a filter unit which acts to restore the interference-free microphone signal $y(t)$ from $x(t)$, $z(t)$ and $H(f,T)$.

18 Claims, 5 Drawing Sheets

Node of the multiplication, smoothing and division layer (14)     input: X(f,T) and Z(f,T)

Fig 5     output: G(f,T)

Node of the convolution layer (15)    input: G(f,T)

Fig 6     output: H(f,T)

PROCESS AND APPARATUS FOR ELIMINATING LOUDSPEAKER INTERFERENCE FROM MICROPHONE SIGNALS

BACKGROUND OF THE INVENTION

1. Field of the Invention

The invention relates to a filter system for eliminating loudspeaker-generated acoustic signals from a microphone signal, said system comprising a stereo sampling unit for sampling the interference-bearing microphone signal and the interfering loudspeaker signal in time (t) and for generating samples x(t) and z(t) which are applied to a computer, wherein said computer ascertains the transfer function H(f, T) between the loudspeaker and the microphone and provides said transfer function to a filter unit (12) adapted to process x(t), z(t) and H(f,T) to generate the interference-free microphone signal y(t).

2. Description of the Related Art

In many applications in telecommunications and in machine voice processing, a problem arises in that the microphone used for voice input may pick up—in addition to the voice signal to be transmitted or to be processed—signals which are generated by one or several loudspeakers used within the same audio system. In a variety of applications, loudspeaker interference of this kind may cause a variety of problems. Best known of these is the problem which arises when a mobile telephone or cellphone user wishing to converse by telephone inside a motor vehicle, for example, uses a so-called hands-free unit which amplifies the called party's signal for output from a loudspeaker. The hands-free microphone will transmit this loudspeaker signal to the partner in addition to ambient noise and the driver's speech signal. This results in the called partner hearing an "echo" of his/her own voice, which echo will be all the more disturbing as the signal propagation time is long. In mobile telephone networks, where signal propagation may take up to 300 ms, this phenomenon constitutes a major problem. As decoders in mobile telephone networks cause non-linear distortion, subsequent echo elimination is all the more difficult in such a case. For this reason, it is absolutely necessary to eliminate the aforesaid loudspeaker interference where it arises, i.e. in the motor vehicle's hands-free device in the example given above.

Another example of the problems caused by loudspeaker interference relates to systems for the machine recognition of voice. The use of systems of this kind is increasing, so that the elimination of loudspeaker signals from the microphone signal controlling the voice recognition system has fundamental importance for these systems also. Voice recognition systems need an input signal as interference-free as possible so as to obtain satisfactory recognition rates. Again, conventional systems of the kind used in motor vehicles, for example, have a so-called "push-to-talk" button for muting the system loudspeaker before the system accepts voice input. This, then, is at variance with the desired hands-free operation, the main point of using a voice recognition system in the first place.

On the basis of the first-mentioned example above, the prior methods of solving the above-described problem are summed up under the term "echo cancelling". All these prior methods are based on variants of an iterative process (LMS for "least mean square") which seeks to minimize the echo signal by the successive adaptation of filter parameters.

The basic principle underlying these algorithms is known e.g. from the textbook by Peter Vary: Digitale Sprachsignalverarbeitung, chapter 13, Teubner Verlag, Stuttgart, 1998. It is described also in U.S. Pat. No. 5,475, 731 and in EP 0 870 365; a variety of proposals for improvement are known by EP 0 988 744 and WO 00/16497. All these methods have in common that their results are optimum only if the microphone picks up the loudspeaker signal only. As soon as additional non-stationary acoustic disturbances are present, such as may occur in a motor vehicle in transit or in a so-called full-duplex situation, in which the partners at both ends of the link speak simultaneously, the performance of all these prior systems deteriorates considerably.

This also applies to a method which is known as an affine projection from U.S. Pat. No. 5,539,731. The improved convergence this method does in fact feature requires an increased computation effort, however.

As in all the aforesaid ones, a duplex situation or disturbing noise input to the microphone cause convergence problems in this method too. Also, the aforesaid methods have the problem of the convergence performance of the algorithms deteriorating rapidly as the filter length increases.

SUMMARY OF THE INVENTION

It is the object underlying the present invention to effectively and efficiently eliminate loudspeaker interference from the microphone signal used for voice input.

This object is attained by the measures set forth in claim 1, in particular by a computation unit in which a Fourier transform unit determines the spectra X(f,T) and Z(f,T) of the microphone signal and the loudspeaker signal, respectively, and processes these to compute the transfer function H(f,T) in multiplying, smoothing and division layers as well as a convolution layer, with the signal propagation delay effective between the loudspeaker and the microphone—as determined in the delay unit—taken into account.

These measures act to effectively eliminate loudspeaker interference from the microphone signal used for voice input, obviating a push-to-talk key. If the loudspeaker signal is generated by a system controlled by voice input, such as a voice-controlled television receiver, the inventive system ensures that voice signals the television set itself generates will not be processed as voice control commands.

The range of applications in which the present invention is suitable is much broader, however. For this reason, reference will generally be had in the explanations that follow to the elimination of loudspeaker interference from a microphone signal.

The present invention presents a novel method in which a network-like computation unit is used to determine the transfer function of the loudspeaker-space system in a direct manner. The computation effort the method requires is quite modest, and the method is extremely resistant to noise disturbances and duplex situations as, unlike all other methods, it does not assume as a starting point the special case of other non-stationary signals—apart from the loudspeaker signal—being absent from the microphone.

These measures are convergent without problems for very long filters too, and the filter length is limited only by available memory. The system implements readily on any hardware platform; it is fully adaptive and does not have to be pre-configured for expected signal propagation delays. In contrast to other systems, it does not call for the prior detection of duplex situations. The system is stable as soon as a loudspeaker signal having sufficient intensity is available. Also, the system will automatically and rapidly track changes in the acoustic system conditions.

Additional advantageous measures are described in the dependent claims. The invention is illustrated in the attached drawings and is described in greater detail hereinbelow.

DETAILED DESCRIPTION OF THE INVENTION

Figure 1:
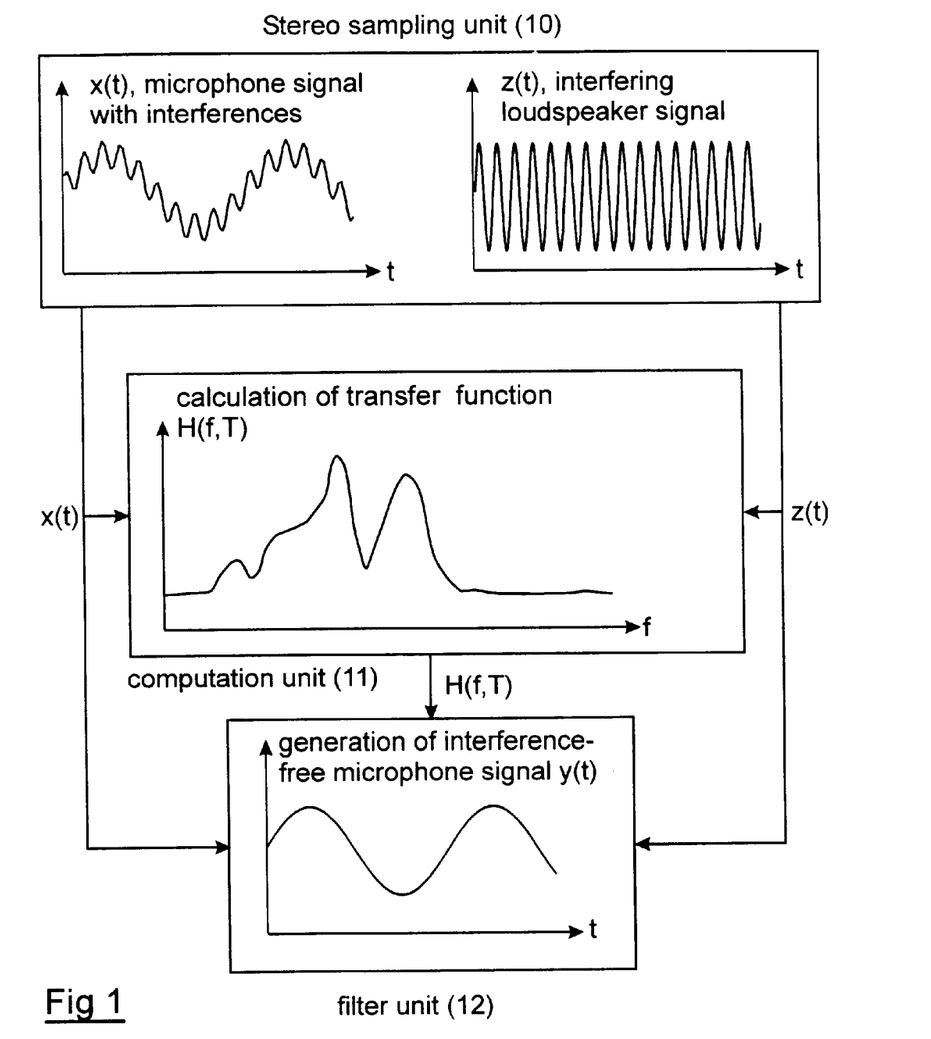
FIG. 1 is a schematic of the filter system.

FIG. 1 shows the inventive interference filtering and elimination system in its entirety, as is discussed more fully below.

Figure 2:
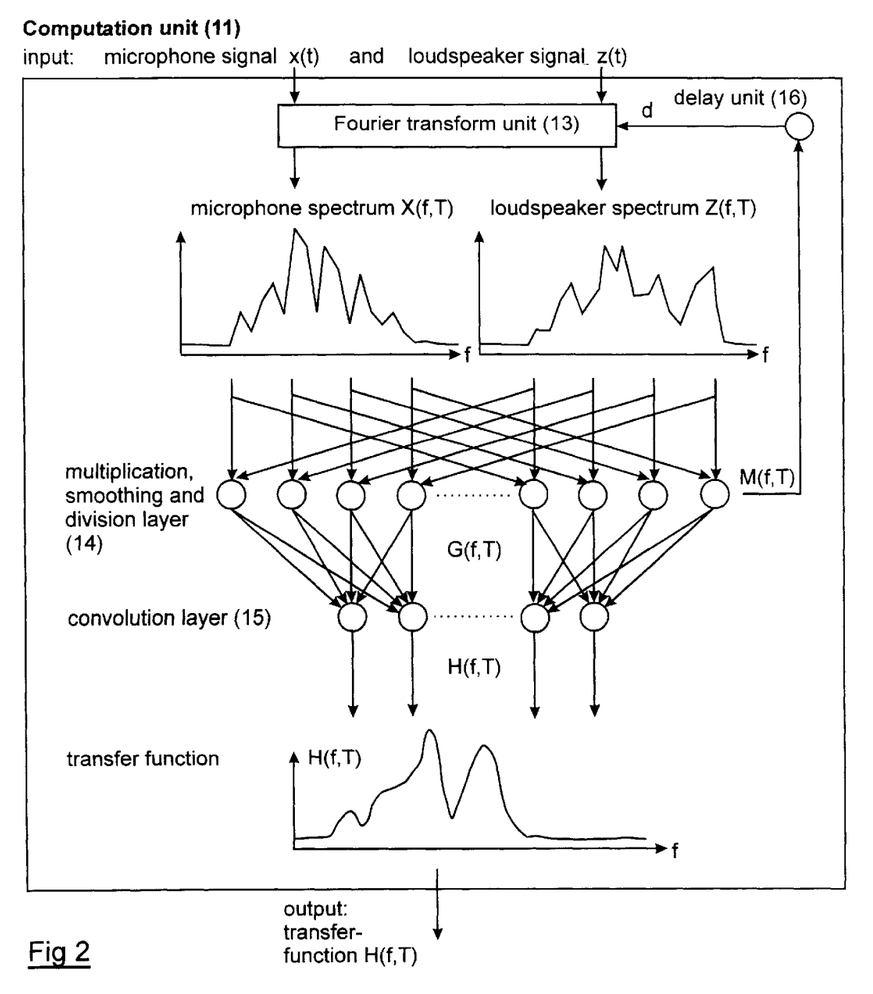
FIG. 2 is a schematic of the computation unit of the filter system.

FIG. 2 shows the computation unit for interference elimination as shown in FIG. 1 which uses multiplication, smoothing and division layers as well as convolution layer to compute the transfer function H(f,T), such computation being based on the loudspeaker-to-microphone propagation delay d determined in the delay unit, and on the microphone and loudspeaker signal spectra X(f,T) and Z(f,T), respectively, derived in a Fourier transform unit.

Figure 3:
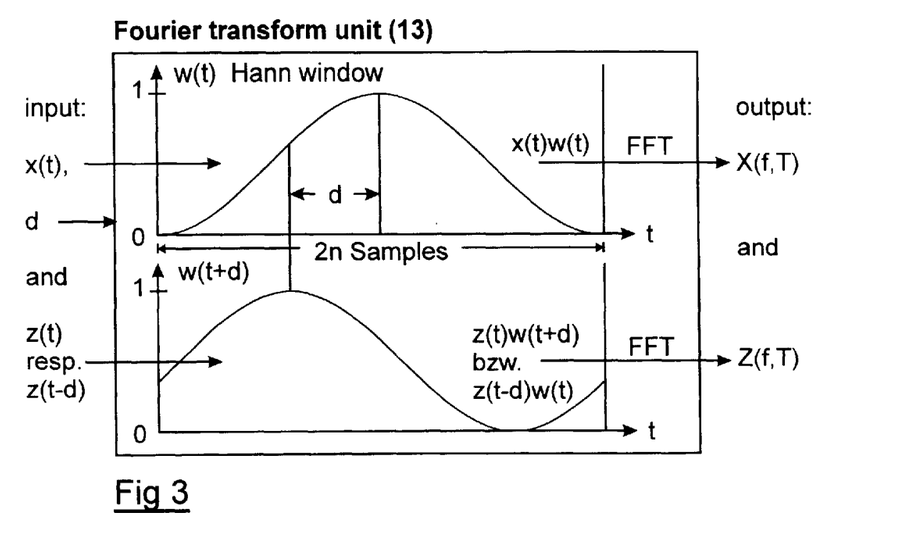
FIG. 3 is a schematic of the Fourier transform unit of the filter system.

FIG. 3 shows the Fourier transform unit operating to determine the spectra of the microphone and loudspeaker signals at time T, i.e. X(f,T) and Z(f,T), from one frame of 2 n samples each of time domain signals x(t) and z(t), respectively, with said frames being multiplied by a window function w(t) such as a Hann window w(t)=(1−cos πt/n)/2) and the loudspeaker signal being delayed by d samples or the window being rotated by d samples.

Figure 4:
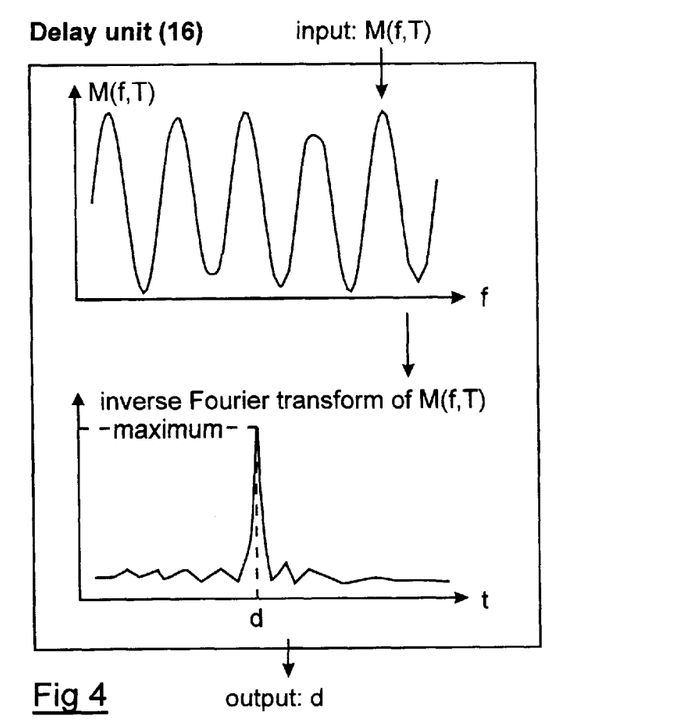
FIG. 4 is a schematic of the delay unit of the filter system.

FIG. 4 shows the operation of the delay unit which determines the signal propagation delay d between the microphone and the loudspeaker by means of peak detection on the inverse Fourier transform of M(f,T).

Figure 5:
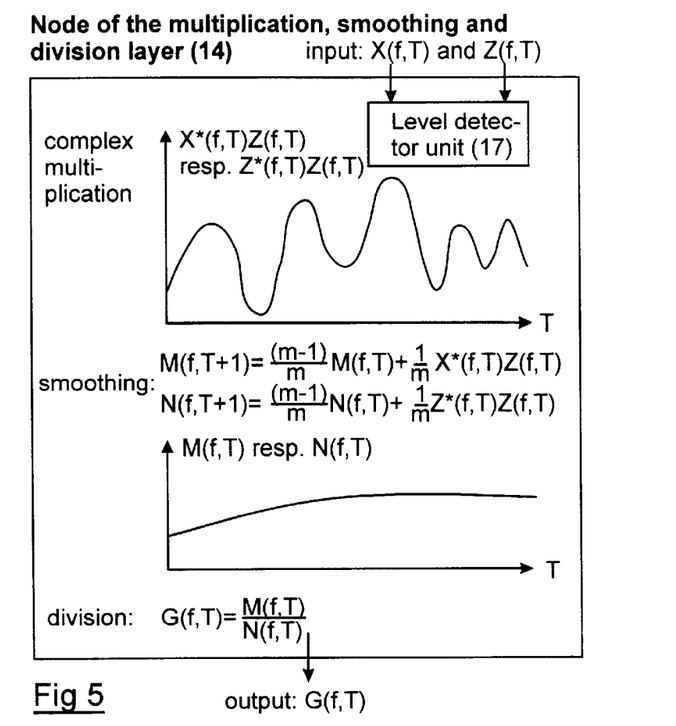
FIG. 5 is a schematic of a node of multiplication, smoothing and division layers of the filter system.

FIG. 5 shows the operation of one node of the multiplication, smoothing and division layer, which node— if the level monitoring unit detects a sufficient signal energy—determines for each time T and for a specific frequency f the values of M(f,T) and N(f,T) as well as the interference function G(f,T) as the quotient M(f,T)/N(f,T), M(f,T) being the product smoothed by decay constant m of the microphone spectrum X(f,T) and of the complex conjugate loudspeaker spectrum Z*(f,T), and N(f,T) being the squared magnitude of the loudspeaker spectrum Z*(f,T)Z(f,T) smoothed by decay constant m.

Figure 6:
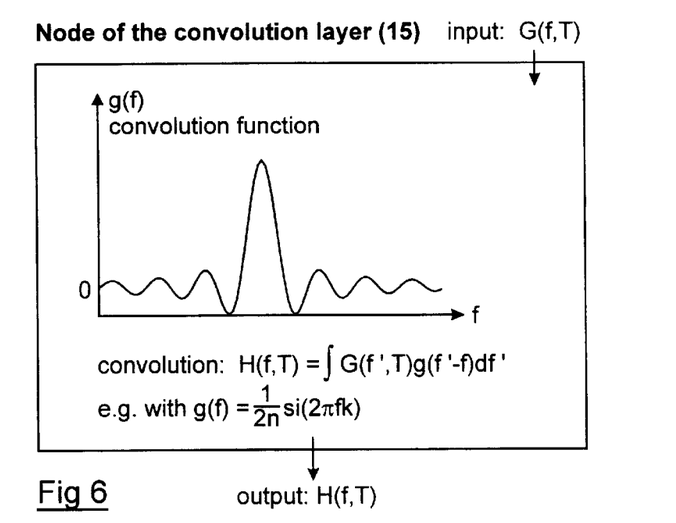
FIG. 6 is a schematic of a node of the convolution layer of the filter system.

FIG. 6 shows the operation of a convolution layer adapted to convolve interference function G(f,T) with a convolution function g(f) such as the Fourier transform of a single-pulse squarewave for all frequencies f at a specific time T, resulting in transfer function H(f,T).

Figure 7A:
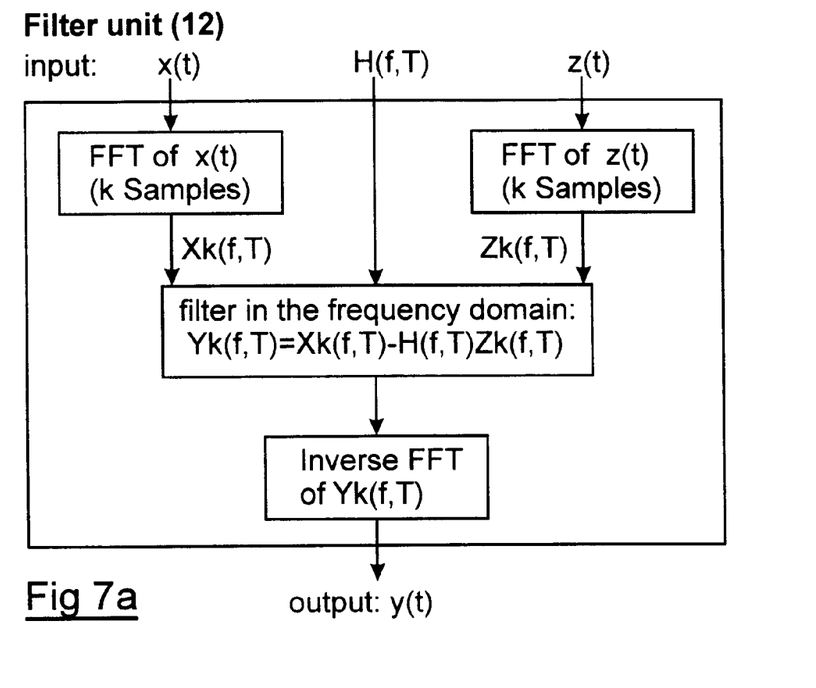
FIG. 7a is a schematic of an embodiment of the filter system wherein the time signals.

FIG. 7a shows a filter unit in which the interference in loudspeaker signal z(t) is removed from microphone signal x(t), and interference-free microphone signal y(t) generated, by means of transfer function H(f,T), wherein time domain signals x(t) and z(t) are Fourier transformed to generate spectra Xk(f,T) and Zk(f,T) consisting of k modes, whereafter Zk(f,T) is multiplied by H(f,T) and the product subtracted from Xk(f,T) to yield Yk(f,T), from which y(t) is recovered by inverse Fourier transformation.

Figure 7B:
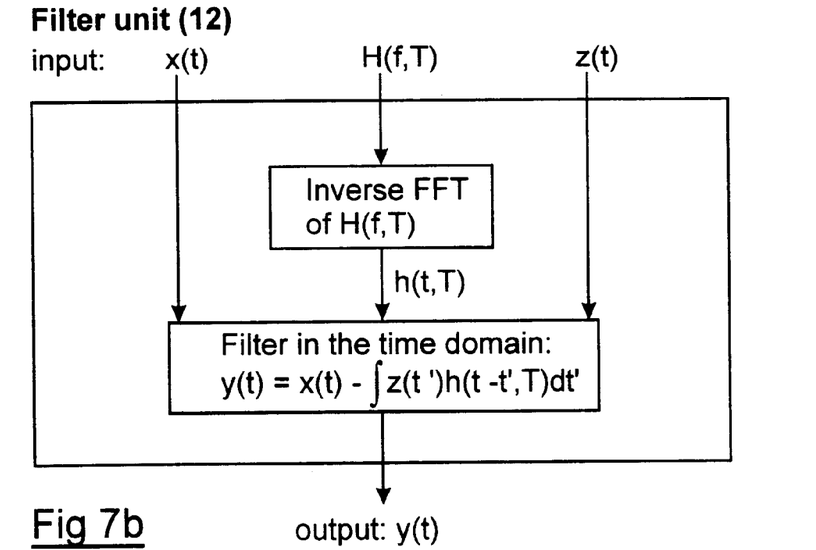
FIG. 7b is a schematic of another embodiment of the filter system.

FIG. 7b shows an alternative filter unit in which z(t) is convolved with h(t,T) in the time domain and the convolute subtracted from x(t) to yield y(t), with h(t,T) derived beforehand from H(f,T) by inverse Fourier transformation.

The invention shown in FIG. 1 will now be explained in greater detail with reference to an embodiment example. To start with, a microphone or voice signal and a loudspeaker signal 25 the microphone picks up in addition to the useful voice signal are sampled and digitized in a stereo sampling unit 10.

This produces samples x(t) and z(t) of the microphone and loudspeaker signals, respectively, in time t. The microphone signal x(t) is the desired signal, while the loudspeaker signal y(t) is the noise, or undesired signal. From these signals, computation unit 11 derives transfer function H(f,T) effective between the loudspeaker and the microphone.

FIG. 2 shows computation unit 11, in which a Fourier transform unit 13 assembles time domain signals x(t) and z(t) to form frames of 2n samples each for the subsequent computation therefrom of spectra X(f,T) and Z(f,T) at a time T.

To this end, and as shown in FIG. 3, both frames are multiplied with a window function w(t), that window function operating on the loudspeaker signal rotated beforehand by the loudspeaker-to-microphone signal propagation delay d, i.e. y(t) is multiplied by w(t+d).

As shown in FIG. 4, the value of d is determined in delay unit 16; it serves to compensate the propagation delay of the loudspeaker signal before it arrives at the microphone. The compensation will be all the more successful as propagation delay d is short relative to frame length 2n. In another embodiment of the invention, the aforesaid delay is compensated explicitly by windowing and Fourier transformation operating on the loudspeaker signal which has been delayed by d, i.e. on z(t−d).

Exact compensation of the signal propagation delay is possible this way; however, an appropriately sized memory will be needed for delaying the loudspeaker signal. In a variant of this embodiment, the window function is applied subsequently to the Fourier transformation of x(t) and z(t) by convolving spectra X(f,T) and Z(f,T) with the Fourier transform of window function w(t).

If the window function is chosen appropriately—such as a Hann window with w(t)=(1−cos πt/n)/2)—this operation is preferred to time-domain windowing as it is unnecessary then to keep an explicit representation of the window function in memory.

The spectra computed in Fourier transform unit 13 are applied to multiplication, smoothing and division layer 14. These layers of computation unit 11 comprise nodes, with each said nodes processing one spectral mode distinguished by its frequency f.

As shown in FIG. 5, level detector unit 17 tests each node for the presence of a spectral intensity sufficient for the operations that follow. Interference function G(f,T) will be computed for modes f only in which X(f,T) and/or Y(t,T) exceed given threshold values at time T. For modes having below-threshold amplitudes, the value G(f,T−1) of the next preceding point in time will be used for G(f,T).

For modes having above-threshold intensities, loudspeaker spectrum Z(f,T) is multiplied by its complex conjugate Z*(f,T) and the product smoothed with a decay constant m, which gives N(f,T).

Analogously, M(f,T) is generated by multiplying microphone spectrum X(f,T) with complex conjugate loudspeaker spectrum Z*(f,T) and smoothing the product with decay constant m. Some time—dependent on decay constant m—after system activation or after changes in the acoustic properties of the acoustic transmission space, G(f,T) will correspond substantially to the desired transfer function. The result will be correct even in the presence of disturbing noise and in duplex situations.

Before loudspeaker interference z(t) is removed from microphone signal x(t) in filter unit 13, G(f,T) is passed on to convolution layer 15 for reducing its spectral resolution. This enables the actual filtering process to be performed in shorter frames consisting of 2k<2n samples, resulting in a reduced signal dwell time in the device when filtering takes place in the frequency domain.

Delay unit 16 derives the signal propagation delay effective between the loudspeaker and the microphone—which is needed in Fourier transform unit 13—from quantity M(f,T), which is determined in multiplying, smoothing and division layer 14 as explained above. To this end, M(f,T) is subjected to inverse Fourier transformation. As shown in FIG. 4, the peak of the resultant signal is located at point d, with d representing the desired propagation delay. It should be kept in mind, however, that the propagation delay so defined includes all reflexions that occur in the surrounding space. For this reason, d will be somewhat greater generally than the quotient of the microphone-to-loudspeaker distance and the speed of sound.

In convolution layer 15, interference function G(f,T) is operated on to derive the desired transfer function H(f,T), which is used thereafter in filter unit 12. H(f,T) is formed by convolving G(f,T) in the frequency domain with a function g(f) and by then evaluating it in a coarser raster only. This operation reduces the spectral resolution of transfer function H(f,T), which will then consist of k modes only while G(f,T) comprised n>k modes before.

In general, the aforesaid reduction of the spectral resolution will be necessary where filtering in unit 12 takes place in the frequency domain, and this because filtering produces a time delay proportional to the length of the filter. If the filtering is performed in the time domain, it will be possible to perform the operation even without a time delay dependent on filter length.

In such an embodiment of the invention, n=k will be possible, i.e. filtering with full spectral resolution. The convolution step described above is unnecessary in this case. The transfer function H(f,T) so derived is provided to filter unit 12, where actual removal of the loudspeaker interference from the microphone signal takes place.

Two different embodiments of filter unit 12 are described below. In the first embodiment, which is shown in FIG. 7a, the time signals of the microphone and loudspeaker signals are again subjected to Fourier transformation. To this end, 2k samples are assembled to form one frame. In the process, the loudspeaker signal is delayed by d samples relative to the microphone signal so as to compensate the loudspeaker-to-microphone propagation delay.

These transformations yield spectrum Xk(f,T) for the microphone signal and spectrum Zk(f,T) for the loudspeaker signal, which—like transfer function H(f,T)—consist of k modes each. Multiplication of H(f,T) with Zk(f,T) and subtraction of the product from Xk(f,T) yields the filtered spectrum Yk(f,T), which is inversely Fourier transformed to generate the interference-free voice signal y(t). This signal, then, can be output from a loudspeaker following digital-to-analog conversion.

In another embodiment of the invention, which is shown in FIG. 7b, filter unit 12 inversely Fourier transforms transfer function H(f,T) to yield a single-pulse response h(t,T). Thereafter, filtering is performed in the time domain by convolving h(t,T) with z(t) and subtracting the product from x(t), which yields interference-free voice signal y(t).

REFERENCE NUMERALS

10 Stereo sampling unit for sampling and digitizing a microphone signal x(t) as well as an interfering loudspeaker signal z(t)

11. Network-like computation unit for assembling time signals x(t) and z(t) in frames, processing these by Fourier transformation to generate microphone spectrum X(f,T) and loudspeaker spectrum Z(f,T) and determining a transfer function H(f,T) from these spectra 12. Filter unit using said transfer function H(f,T)to generate from microphone signal x(t) und the loudspeaker signal the interference-free microphone signal y(t)

13. Fourier transform unit adapted to apply signal delays and/or window functions and to transform time-domain signals x(t) and z(t) into spectra X(f,T) and Z(f,T), respectively 14. Multiplication, smoothing and division layer of said network-like computation unit (11)

15. Convolution layer of said network-like computation unit (11)

16. Delay unit for determining the signal propagation delay d effective between the loudspeaker and the microphone 17. Level detector unit for the loudspeaker and microphone signal spectra d Delay time used in Fourier transform unit (13) as determined by delay unit (16)

f frequency by which the individual modes of a spectrum differ

G(f,T) Interference function from which transfer function H(f,T) is formed by convolution with g(f)

g(f) Spectral function used to convolve G(f,T) so as to generate H(f,T)

H(f,T) Transfer function of the loudspeaker-space system h(t,T) Single-pulse response, inverse Fourier transform of transfer function H(f,T)

k Number of modes in spectra Xk(f,T), Yk(f,T) and Zk(f,T), as well as in H(f,T)

m Decay constant used for smoothing in the generation of M(f,T) and N(f,T)

n Number of modes in X(f,T), Y(f,T), Z(f,T), M(f,T), N(f,T) and G(f,T)

M(f,T) Smoothed product of the microphone spectrum and of the complex conjugated loudspeaker spectrum N(f,T) Smoothed squared magnitude of the loudspeaker signal spectrum Z(f,T)

t Time at which the voice signal is sampled

T Time at which the time-domain signal is processed to form frames and these are processed to derive spectra w(t) Window function, e.g. Hann window $w(t)=(1-\cos pt/n)/2$ x(t) Time-domain signal of the microphone signal disturbed by loudspeaker interference X(f,T) Spectrum of the microphone signal comprising n modes, microphone amplitude at frequency f and at time T Xk(f,T) Spectrum of the microphone signal comprising k modes y(t) Time-domain signal of the interference-free microphone signal Y(f,T) Spectrum of the microphone signal after removal of the loudspeaker signal interference Yk(f,T) Spectrum of the microphone signal, comprising k instead of n modes z(t) Time-domain signal of the loudspeaker signal Z(f,T) Loudspeaker signal comprising n modes, loudspeaker amplitude at frequency f and at time T Zk(f,T) Loudspeaker comprising k instead of n modes

What is claimed is:

1. A filter system comprising:
    a stereo sampling unit to sample a microphone signal and a loudspeaker signal;
    a computation unit for generating a transfer function between the microphone signal and the loudspeaker signal; and
    a filter unit;
    wherein said stereo sampling unit samples the microphone signal to generate a microphone signal sample x(t) in the time domain; and
    said stereo sampling unit samples said loudspeaker signal to generate a loudspeaker signal sample z(t) in the time domain; and
        said computation unit comprising:
            a Fourier transform unit;
                said Fourier transform unit to compute a microphone spectrum X(f,T) and a loudspeaker spectrum Z(f,T),
            multiplying, smoothing and division layers;
                said multiplying, smoothing and division layers for processing said spectra X(f,T) and Z(f,T),
            a convolution layer;
                said convolution layer to convolve inputs to produce a transfer function H(f,T); and
            a time delay unit to determine the signal propagation delay d between said microphone signal and said loudspeaker signal,
    wherein said computation unit uses said microphone signal sample x(t), said loudspeaker signal sample z(t), said microphone spectrum X(f,T) and said loudpseaker spectrum Z(f,T) to generate said transfer function H(f,T), and
    said filter unit uses said microphone signal sample x(t), said loudspeaker signal sample z(t), and said transfer function H(f,T) to generate an interference free signal, y(t).

2. The filter system of claim 1 wherein said Fourier transform unit assembles said microphone signal sample x(t) and said loudspeaker signal sample z(t) to form frames of 2n samples each, said Fourier transform unit to determine said microphone spectrum X(f,T) of said microphone signal sample x(t) and said loudspeaker spectrum Z(f,T) from said loudspeaker signal sample z(t) at time (T) from said frames.

3. The filter system of claim 2 wherein said frames are multiplyable by a window function w(t), with said loudspeaker signal sample z(t) being delayed by d samples.

4. The filter system of claim 3 wherein said window function w(t) is rotated by d samples.

5. The filter system of claim 3 wherein said window function w(t) is a Hann window defined as w(t)=(1−cos(πt/n))/2).

6. The filter system of claim 1 further comprising a level detector unit; wherein said level detector unit detects the signal energy of said loudspeaker signal sample z(t) to determine if said loudspeaker signal sample z(t) is above a predetermined threshold value.

7. The filter system of claim 6 wherein said loudspeaker spectrum Z(f,T) has a complex conjugate loudspeaker spectrum Z*(f,T), and wherein said level detector unit provides a smoothed product N(f.T) of said loudspeaker spectrum Z(f,T), at each time (T) and for a specific frequency f when said signal energy is above said threshold value, wherein said smoothed product N(f,T) of said loudspeaker spectrum Z(f,T) is obtained by multiplying said loudspeaker spectrum Z(f,T) with said complex conjugate loudspeaker spectrum Z*(f,T).

8. The filter system of claim 1 wherein said loudspeaker spectrum Z(f,T) has a complex conjugate loudspeaker spectrum Z*(f,T), and wherein said microphone spectrum X(f,T) is multiplied by said complex conjugate loudspeaker spectrum Z*(f,T) and then smoothed by a decay constant m to generate a smoothed product M(f,T) of said microphone spectrum X(f,T).

9. The filter system of claim 8 wherein said time delay unit derives said signal propagation delay d effective between said microphone signal and said loudspeaker signal by detecting the peak in the inverse Fourier transform of said smoothed product M(f,T) of said microphone spectrum X(f,T).

10. The filter system of claim 9 wherein an interference function G(f,T) is obtained by dividing said smoothed product N(f,T) of said loudspeaker spectrum Z(f,T) into said smoothed product M(f,T) of said microphone spectrum X(f,T).

11. The filter system of claim 10 wherein said convolution layer operates to convolve said interference function G(f,T) with a convolution function g(f) for all frequencies f at a specific time T.

12. The filter system of claim 11 wherein said convolution function g(f) is the Fourier transform of a single-pulse square wave function.

13. The filter system of claim 11 wherein the convolution of said interference function G(f,T) with said convolution function g(f) is effective to generate said transfer function H(f,T).

14. The filter system of claim 1 wherein said filter unit is adapted to remove said loudspeaker signal z(t) from said microphone signal x(t) or from a loudspeaker time-domain signal z(t) with the aid of said transfer function H(f,T) to yield an interference-free microphone signal y(t).

15. The filter system of claim 14 wherein a microphone signal spectrum Xk(f,T) consisting of k modes can be generated by Fourier transformation from said microphone signal sample x(t) and/or said loudspeaker signal sample z(t).

16. The filter system of claim 15 wherein a loudspeaker signal spectrum Zk(f,T) consisting of n modes can be generated by Fourier transformation from said microphone signal sample x(t) and/or said loudspeaker signal sample z(t).

17. The filter system of claim 16 wherein said loudspeaker signal spectrum Zk(f,T) is multiplied by said transfer function H(f,T) and the product subtracted from said microphone signal spectrum Xk(f,T) to give a microphone signal spectrum Yk(f,T) which by inverse Fourier transformation yields a time-domain signal y(t) of the interference-free microphone signal.

18. The filter system of claim 1 characterized in that a time-domain signal z(t) is convolved with a single-pulse response h(t,T) of an inverse Fourier transform of transfer function h(t,T) and the convolute subtracted from said microphone signal sample x(t) whereby a time-domain signal y(t) of the interference-free microphone signal is obtained, said single-pulse response h(t,T) derived beforehand from transfer function H(f,T) by inverse Fourier transformation.

* * * * *